US009496105B2

(12) United States Patent
McAllister

(10) Patent No.: US 9,496,105 B2
(45) Date of Patent: Nov. 15, 2016

(54) SYSTEM FOR DYNAMICALLY ADJUSTABLE DETENT

(71) Applicant: Kostal of America, Troy, MI (US)

(72) Inventor: Glen McAllister, Davisburg, MI (US)

(73) Assignee: KOSTAL OF AMERICA, Troy, MI (US)

( * ) Notice: Subject to any disclaimer, the term of this patent is extended or adjusted under 35 U.S.C. 154(b) by 0 days.

(21) Appl. No.: 14/773,439

(22) PCT Filed: Mar. 14, 2014

(86) PCT No.: PCT/US2014/029099
§ 371 (c)(1),
(2) Date: Sep. 8, 2015

(87) PCT Pub. No.: WO2014/144615
PCT Pub. Date: Sep. 18, 2014

(65) Prior Publication Data

US 2016/0020045 A1 Jan. 21, 2016

Related U.S. Application Data

(60) Provisional application No. 61/791,009, filed on Mar. 15, 2013.

(51) Int. Cl.
*H04B 3/36* (2006.01)
*H01H 19/14* (2006.01)
(Continued)

(52) U.S. Cl.
CPC ................ *H01H 19/14* (2013.01); *G05G 5/03* (2013.01); *G05G 1/08* (2013.01); *G05G 5/04* (2013.01);
(Continued)

(58) Field of Classification Search
CPC .................................................... G09B 21/003
(Continued)

(56) References Cited

U.S. PATENT DOCUMENTS 5,159,706 A * 10/1992 Hodsdon .................. H04B 1/38 200/11 R
5,340,018 A * 8/1994 MacDonald ....... G05D 23/1353 236/12.2
(Continued)

FOREIGN PATENT DOCUMENTS

CN 2035441 U 4/1989
CN 1700132 A 11/2005
(Continued)

OTHER PUBLICATIONS

First Office Action in China dated Jun. 24, 2016; 11 pages.
International Search Report dated Sep. 4, 2014; 3 pages.

*Primary Examiner* — Daryl Pope
(74) *Attorney, Agent, or Firm* — Linda D. Kennedy; Bill C. Panagos; Butzel Long, P.C.

(57) ABSTRACT

Dynamically adjustable rotary actuator devices are described. As a knob is rotated on an electronic system such as a radio and a limit is approached and ultimately reached (such as a volume limit), the described systems and methods create a progressive haptic force on the knob to indicate to the operator that the limit is being approached and/or has been reached. For example, when a maximum volume limit has been reached in a radio application, the haptic force can prevent the knob from rotating any further.

11 Claims, 3 Drawing Sheets

(51) Int. Cl.
*G05G 5/03* (2008.04)
*G05G 1/08* (2006.01)
*G05G 5/04* (2006.01)

(52) U.S. Cl.
CPC .... *H01H 2221/01* (2013.01); *H01H 2231/026* (2013.01); *H01H 2231/036* (2013.01)

(58) Field of Classification Search
USPC .......... 340/407.1, 425.5; 455/90.3, 344, 347, 455/351; 200/11 R
See application file for complete search history.

(56) References Cited

U.S. PATENT DOCUMENTS

| | | | | |
|---|---|---|---|---|
| 6,536,917 | B1 * | 3/2003 | Aperocho | F21V 33/0056 362/183 |
| 7,510,158 | B1 * | 3/2009 | Terry | B60N 3/106 220/529 |
| 2007/0279401 | A1 * | 12/2007 | Ramstein | G06F 3/016 345/184 |
| 2008/0197004 | A1 | 8/2008 | Ishigaki et al. | |

FOREIGN PATENT DOCUMENTS

| | | | |
|---|---|---|---|
| CN | 1904775 | A | 1/2007 |
| CN | 101396954 | A | 4/2009 |
| DE | 102005056992 | A1 | 5/2007 |
| DE | 102006007600 | A1 | 8/2007 |

* cited by examiner

SYSTEM FOR DYNAMICALLY ADJUSTABLE DETENT

RELATED APPLICATIONS

This application claims priority to the U.S. provisional application titled "System for Dynamically Adjustable Detent" filed Mar. 15, 2013, having Ser. No. 61/791,009, herein incorporated by reference in its entirety.

TECHNICAL FIELD

In the control of electronic devices, such as audio equipment, rotary actuator devices to control volume are generally provided with hard stops along the circumferential path of their rotation, so that the operator may turn a rotary device in one direction to increase volume, and in the opposite direction to decrease volume. By using hard stops, the operator receives an abrupt haptic indication when the device has reached maximum volume, at which point no further rotation of the knob in that direction is permitted. Such rotary devices leave an unresolved issue when the electronic device is turned off while the volume level is set quite high, and later, when the auditory device is turned on, the volume s still set at a high volume, oftentimes when such a high volume is unwanted by the operator.

There is a need for a directionally unique dynamically adjustable rotary actuator. Such rotary actuator devices may be incorporated in a wide variety of systems including electronic devices. By way of non-limiting example, such systems may included in systems installed automotive vehicles.

SUMMARY

In one embodiment, there is disclosed a dynamically adjustable rotary actuator device, comprising a knob rotatable about an axis; a detent ring fixed on a base and having a plurality of cam detents. The detent ring surrounds said knob and rotatably retains the knob within the detent ring. The actuator device includes at least one detent engagement device movable from a first position to exert progressive biasing force against the cam detents upon rotation of the knob. A gear assembly is provided for engaging the detent engagement device. The gear assembly may be fixed in place unless driven in response to rotation of the knob. The gear assembly is driven by an electric motor, which motor is responsive to manual rotation of the knob about the axis by an operator. As the knob is rotated, the detent engagement device follows the cams in the detent ring, and current supplied to the motor, the gear assembly is progressively engaged to provide progressive bias force to the detent engagement device, and the detent engagement device is progressively biased against the cam detents to create a haptic force to the operator to prevent further rotation of the knob. The device may be controlled by an electronic controller with memory and instructions for controlling the motor in response to the rotation of the knob. At least one detent engagement device may be in communication with a position sensor such that when one detent engagement device is in contact with a cam surface the second detent device may be positioned before actual contact with the cam surface to provide infinite number of adjustable positions for rotation of the knob. When current ceases to the motor, the detent engagement device returns to its first position. When current is return to the motor, the operator may rotate the knob as previously described and gain haptic input that no further rotation of the knob is permitted without the need for hard stops in the rotary actuating device.

DETAILED DESCRIPTION

While an embodiment is described in relation to the figures, it is to be understood that such a description is merely illustrative, and is in no way intended to is to be taken as limiting the invention in any manner. Moreover, the words used to describe the embodiments are not words of limitation, but merely words of description.

Figure 1:
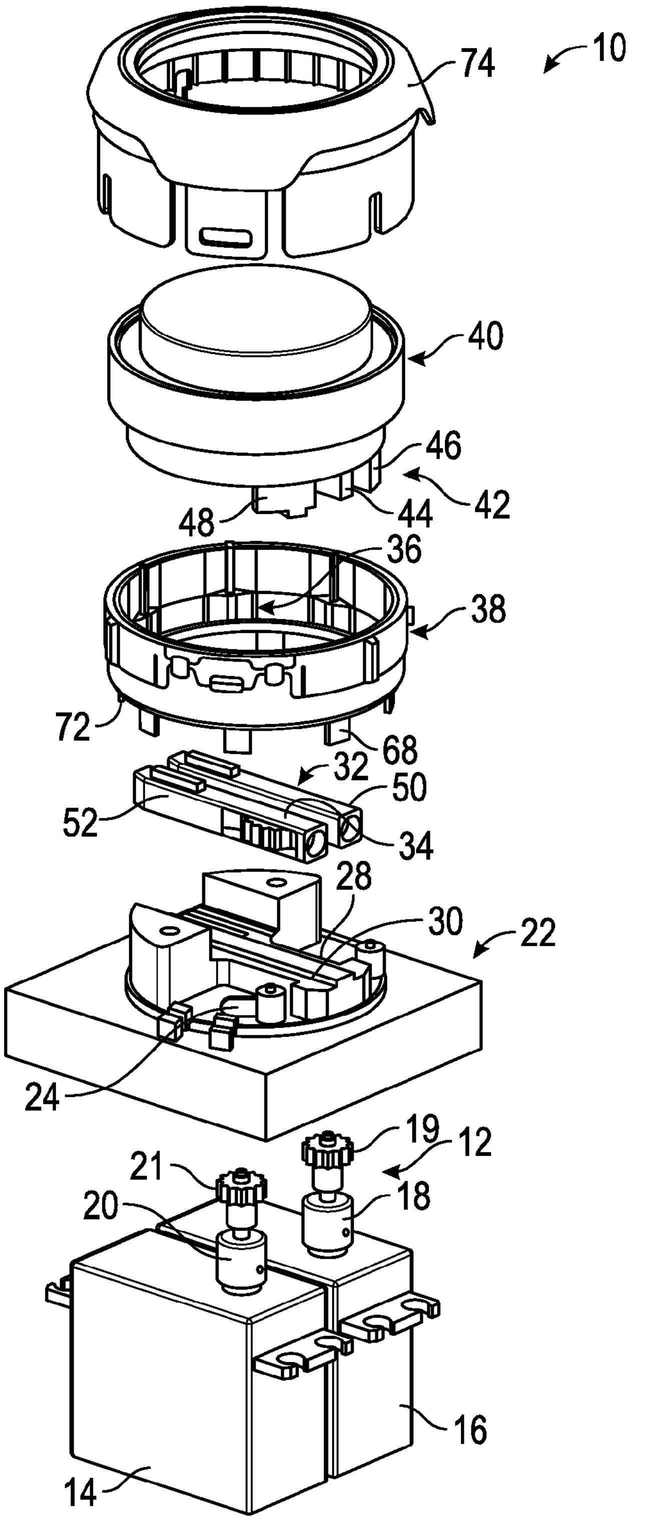
FIG. 1 is an exploded view of one embodiment of the rotary actuating device.
Figure 2:
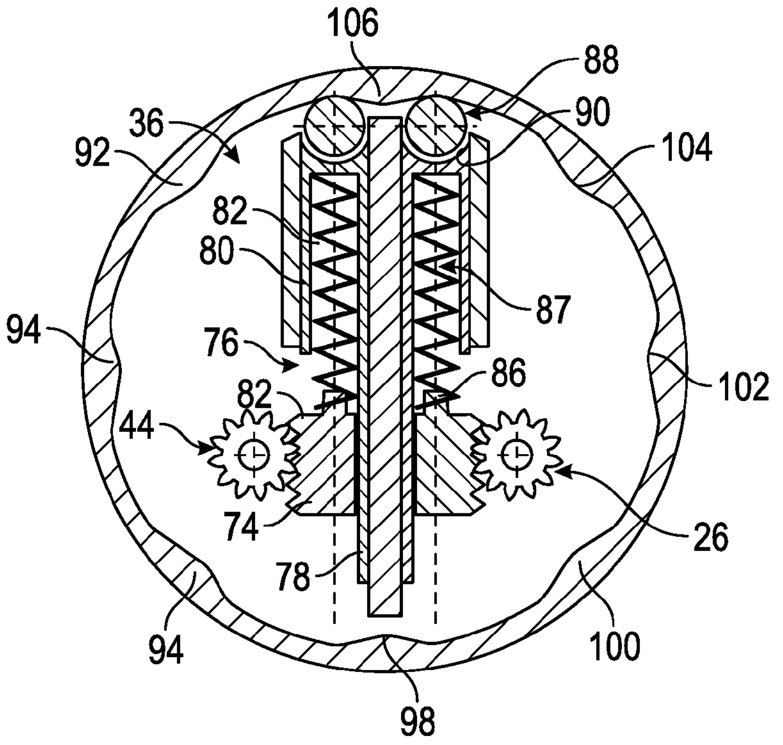
FIG. 2 is a cutaway transverse sectional top view of one embodiment of the rotary device showing the can detent and detent engagement devices.
Figure 3:
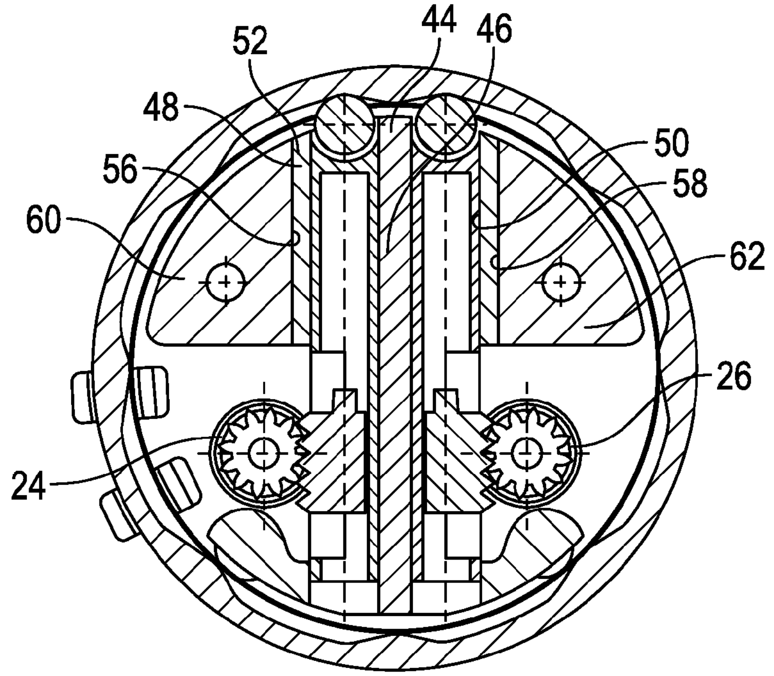
FIG. 3 is a cutaway transverse top view of one embodiment of the rotary device mounted on a base for interaction with the actuator.

Turning to FIGS. 1-3, FIG. 1 is an exploded view of one embodiment of the rotary actuating device 10. Actuator 12 is shown as a pair of electronically electric motors, 14 and 16, respectively, each having an actuating gear rotatable by the motor, rotatably mounted at rotary mounts 18 and 20. The gears may be removable from the mounts for servicing purposes.

A base 22 is provided which may be adapted to be carried by the actuator. The base has, in this case, two apertures 24 and 26, of sufficient size to accommodate the actuator gear mounts such that the gear mounts and the gears may extend through the base. The base is equipped with runners 28 and 30 to accommodate coordinated, independent transverse sliding movement of the detent engagement devices 32 and 34 in response to the rotary movement of the gears to engage the cam detents of cam ring 36 in a manner to be hereinafter described.

A cam detent ring assembly 38 is provided, which is equipped with encoder teeth to act as position sensors in conjunction with the rotary knob actuator 40 in a manner to be hereinafter described. The rotary knob is equipped with a guide assembly 42, comprised of a driver guide 44 that is insertable between the detent engagement devices when they detent engagement devices are seated in the transverse slides, and shepherd guides 46 and 48 which are dimensioned to interact with the outside perimeter 50, 52 of the detent engagement devices to facilitate rotation of the detent engagement devised in repose to the rotation of the knob. As best seen in FIG. 3, when the knob is seated in place, the driver guide is in abutting engagement with the periphery of the detent engagement devices, and the shepherd guides are in abutting engagement with both the outer peripheries 56, 58 of the detent engagement devices and with the inner peripheries 60, 62 of base supports 64 and 66, respectively. Turning back to FIG. 1, the detent ring has at least one, and preferable a plurality of encoder teeth 68 circumferentially disposed along the lower circumference 72 of the detent ring. The rotary knob is held in place within the detent ring by a snap fit ring 74 which matingly engages suitable apertures in the detent ring.

Having generally described the structure, FIG. 2 shows transverse cutaway top view showing the cam detent ring and one detent engagement device configuration. An individual detent engagement device will be described, it being understood that each guide is constructed similar to the other.

The detent engagement device has a hollow body 76, with outer walls 78 and 80 defining an interior space 82. Wall 78 is of greater length than wall 80, so that it provides engagement surface with the rotary knob driver guide 44. Wall 80 is of similar length as the shepherd guide of the rotary knob to provide abutting engagement with the shepherd guide. The actuator gears are in close proximity to the detent engagement device and matingly intermesh with the teeth 82 of the sled 84. The sled has a projection 86, which acts as a guide for a biaser, shown as a coil spring 87, but which could be made of an elastic material, that fits into the interior of the detent engagement device and is progressively compressible to exert a progressive biasing force onto the cam follower 88 in radiused seat 90 at an end of the detent engagement device, which follows the cam detents 92, 94, 96, 98, 100, 102, 104, and 106 respectively of the ring during rotation of the knob.

The rotary actuator device is controlled by an electronic device, such as a controller having memory such as PROM, EPROM, EEPROM, FLASH or any other memory capable of running instructions for the operation of the system. The controller receives input from the position sensors, and sends and electric signal to particular motor to cause the actuator to move the biaser and progressively increase the biasing force exerted on the cam detent follower consistent with the sensed position. While an electronic controller is described, it is understood that a computer readable medium having software or instructions therein may also be included such that the controller receives instructions from the computer readable medium to operate the system.

In operation, the rotary actually device provides a system for directionally unique dynamically adjustable detent efforts of a rotational input device with user feedback in the form of variable torque required to rotate the input device, which in this instance is the knob. Utilizing cam profiles separated by equal distances or angle as the profiles themselves, with detent followers on opposing sides of the cam profiles, unique forces on the two followers allow for unique efforts in two directions of travel by compressing the biasers supporting the followers of the actuator. The force required to move the detent followers is adjusted dynamically between movements of the knob, allowing for an infinite number of virtual positions from the finite number of physical positions. In addition, the device permits the creation of virtual end stops to the travel of the knob by increasing the force required to overcome the detents beyond the force the operator can apply to the system By using a position sensor or encoder in conjunction with the actuators when operating the knob, the follower not in contact with a detent may be adjusted by rotation of the actuator gear for the next position before the position is reached, thereby allowing for seamless unique efforts for an infinite number of positions or rigid end stops.

Figure 4:
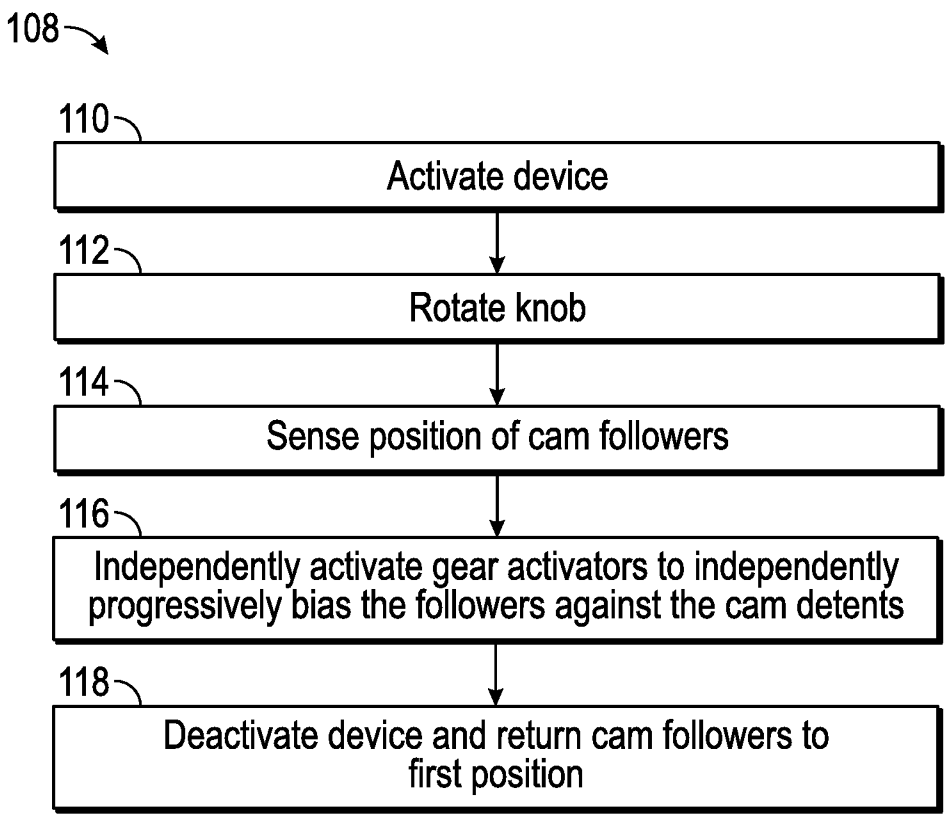
FIG. 4 is an exemplary method to operate a rotary actuating device.

FIG. 4 is a schematic representation of one exemplary method 108 for operating the rotary device. Specifically, step 110 is activate an electric device for which the knob is a control. Such a device may be an audio device, such as a sound system in an automobile. Step 112 is rotate the knob. Step 114 is sense the position of the cam followers and step 116 is independently actuate the gear actuators to independently progressively bias the followers from a first position against the can detents. Step 118 is deactivate the electric device and return the cam followers to a first position.

While one embodiment has been described, it will be apparent that many variations and modifications may be possible without departing from the scope and sprit of the invention.

What is claimed as new and desired to be protected by Letters Patent of the United States is:

1. A dynamically adjustable rotary actuator device, comprising:

a knob rotatable about an axis;

a detent ring fixed on a base and having a plurality of cam detents, the detent ring surrounds said knob and rotatably retains the knob within the detent ring;

at least one detent engagement device movable from a first position to exert progressive biasing force against said cam detents upon rotation of the knob;

a gear assembly engaging the detent engagement device, said gear assembly fixed in place unless driven in response to said knob rotation; and an electric motor for driving the gear assembly responsive to manual rotation of the knob about the axis by an operator;

wherein, as the knob is rotated, the detent engagement device follows the cams in the detent ring, the detent engagement device position is sensed, the sensed position is communicated to a controller, the controller activates the gear assembly to provide progressive bias force to the detent engagement device to create a haptic force until a predetermined position wherein further rotation of the knob is prevented.

2. The dynamically adjustable rotary actuator device of claim 1, wherein when current to the motor is terminated, at least one engagement device returns to said first position.

3. The dynamically adjustable rotary actuator device of claim 1, wherein the controller includes a memory having instructions for operation of the motor in response to the rotation of the knob.

4. The dynamically adjustable rotary actuator device of claim 1, further including two detent engagement devices and a position sensor in conjunction with said detent engagement devices such that when a first detent engagement device is in contact with the cam surfaces, a second detent engagement device not in contact with a detent may be adjusted for a next position before said position is actually reached, thereby permitting seamless rotation for an infinite number of virtual positions during rotation of the knob.

5. An audio system including the adjustable rotary actuator device of claim 1.

6. An automotive vehicle including the adjustable rotary actuator device of claim 1.

7. A system for imparting a haptic force to a rotational knob, comprising:

an electronic system having a knob rotatable about an axis;

a detent ring fixed on a base and having a plurality of cam detents, the detent ring surrounds said knob and rotatably retains the knob within the detent ring;

at least one detent engagement device movable from a first position to exert progressive biasing force against said cam detents upon rotation of the knob;

a gear assembly engaging the detent engagement device, said gear assembly fixed in place unless driven in response to said knob rotation;

an electric motor for driving the gear assembly responsive to manual rotation of the knob about the axis by an operator; wherein, as the knob is rotated, the detent engagement device follows the cams in the detent ring;

a position sensor for sensing a position of the detent engagement device; and a controller in in electrical communication with the sensor, the controller being adapted to activate the gear assembly and, based at least in part on the sensed position of the detent engagement device, to cause progressive impartation of a haptic force until a position is reached where further rotation of the knob is prevented.

8. The system of claim 7, wherein when current to the motor is terminated, at least one engagement device returns to said first position.

9. The system of claim 7, further including two detent engagement devices and a position sensor in conjunction with said detent engagement devices such that when a first detent engagement device is in contact with the cam surfaces, a second detent engagement device not in contact with a detent may be adjusted for a next position before said position is actually reached, thereby permitting seamless rotation for an infinite number of virtual positions during rotation of the knob.

10. An audio system including the system of claim 7.

11. An automotive vehicle including the system of claim 7.

* * * * *